United States Patent [19]
Galuszka et al.

[11] Patent Number: 5,267,199
[45] Date of Patent: Nov. 30, 1993

[54] APPARATUS FOR SIMULTANEOUS WRITE ACCESS TO A SINGLE BIT MEMORY

[75] Inventors: Robert J. Galuszka; Andrew J. Walton, both of Reading; Clinton Choi, Maindenhead, all of United Kingdom

[73] Assignee: Digital Equipment Corporation, Maynard, Mass.

[21] Appl. No.: 723,054

[22] Filed: Jun. 28, 1991

[51] Int. Cl.[5] .................................... G11C 7/00
[52] U.S. Cl. ...................... 365/189.04; 365/189.07
[58] Field of Search ............... 365/189.04, 189.07, 365/189.08

[56] References Cited

U.S. PATENT DOCUMENTS

| | | | |
|---|---|---|---|
| 4,663,742 | 5/1987 | Anderson et al. | 365/189.04 |
| 5,036,491 | 7/1991 | Yanaguchi | 365/189.07 |

Primary Examiner—Steven Mottola
Attorney, Agent, or Firm—Kenyon & Kenyon

[57] ABSTRACT

In an apparatus including a first and second processor coupled to a shared bit-RAM memory, simultaneous write operations can be performed without internal race conditions in the memory. Rather than using arbitration, a write is generated by logic in each processor only when data to be written is different from data currently stored in a given location. A processor can write data to the bit-RAM only when a write pulse has been generated by that processor. Clocking signals from the processors are used to insure that a read and a write operation are not performed by two separate processors.

9 Claims, 4 Drawing Sheets

APPARATUS FOR SIMULTANEOUS WRITE ACCESS TO A SINGLE BIT MEMORY

FIELD OF THE INVENTION

The present invention is directed to an apparatus for controlling write and read operations performed on a memory. More particularly, the present invention provides an apparatus which allows simultaneous write access to a single bit memory by two or more processors.

BACKGROUND OF THE INVENTION

Shared memory devices, such as a dual port RAM, are normally coupled to two or more processors, each accessing the memory device during read or write operations. One of the more prevalent problems in operating such a device is the simultaneous access of the memory by competing processors. Such a condition can lead to erroneous data being read from or written to the memory. It can also lead to internal race conditions in the memory device.

One of the techniques for dealing with such a problem is to perform arbitration between competing processors, so that only one of the processors asserts control of the memory at any given time. However, the additional circuitry for arbitration slows memory operations and decreases performance.

Another technique for solving this problem is to operate the memory at a higher frequency than that of the processors (e.g., twice the frequency). Though reducing the probability of simultaneous memory accesses, the same errors can still occur. Also, the operating speed of modern high performance processors can be so fast that increasing the speed of the memory by a factor of two or more becomes difficult.

SUMMARY OF THE INVENTION

The present invention is directed to an apparatus that allows simultaneous write operations for processors coupled to a shared memory, such as a dual port RAM. Each of the processors includes logic circuitry which controls the generation of a write pulse for enabling data to be written to the memory by the respective processor. The logic circuitry compares the value to be written by a processor to the value currently stored in memory. If the two values are different, the write pulse is generated. In a bit-RAM implementation, multiple writes can occur simultaneously, since a write pulse will only be generated for both processors if both are writing the same value to the memory, and that value to be written is different from the one currently stored in the memory.

The circuitry uses only signals directly available from the processors. In order to insure that write and read operations do not overlap between the processors accessing the shared memory, clocking signals are used from all processors to control the duration of the write pulses. Also, clocking signals are used to latch data read from the shared memory to prevent a simultaneous read/write operation on the same location in the shared memory.

DETAILED DESCRIPTION

Figure 1:
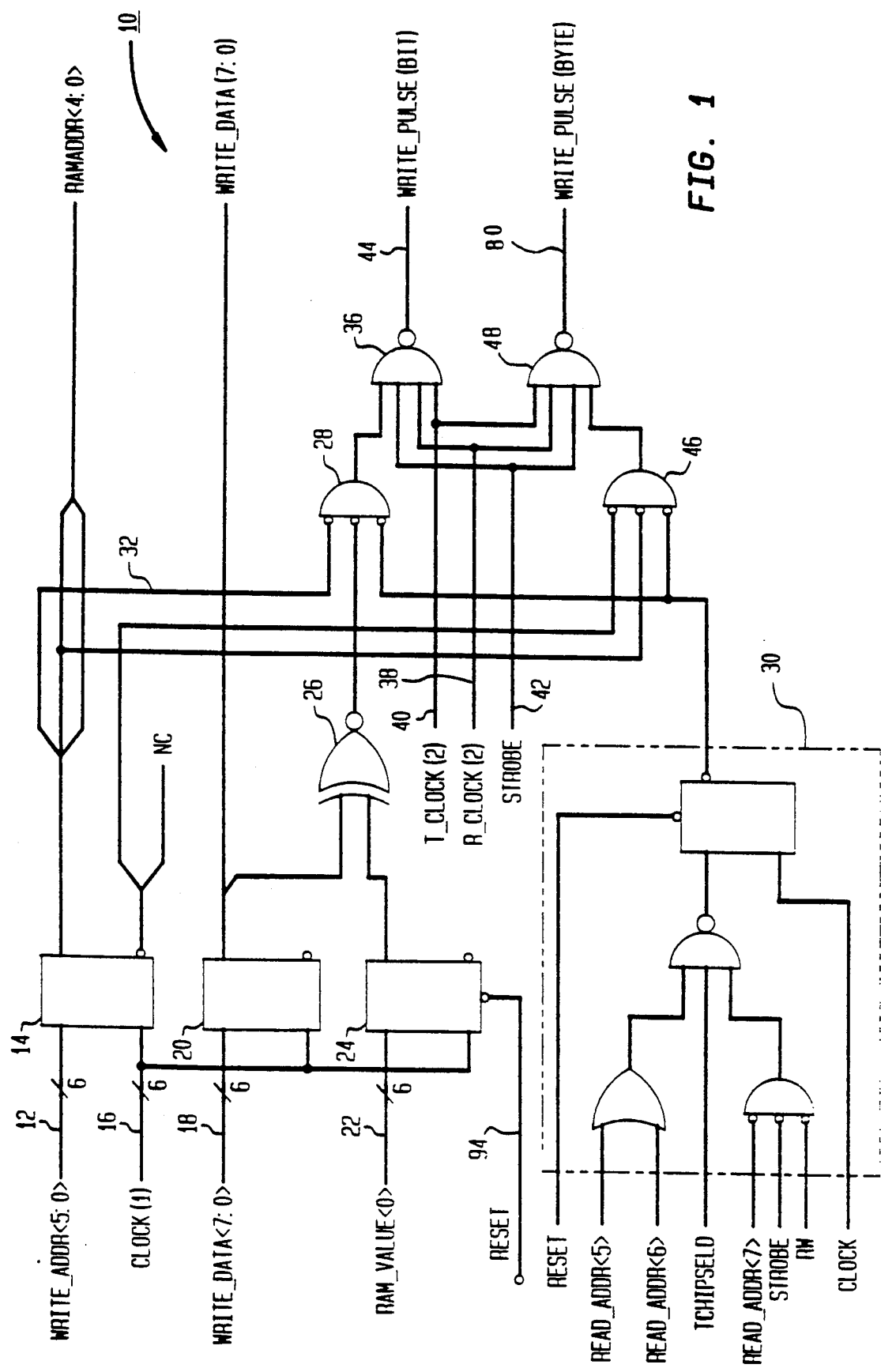
FIG. 1 is a detailed diagram of the write logic circuitry of a processor constructed according to an embodiment of the present invention.

In this embodiment of the present invention, two processors access a shared memory device. The processors can be a transmit processor and a receive processor, each comprising ASIC circuitry and residing on a high speed line interface card. Referring to FIG. 1, the write logic circuitry 10 of the transmit processor, is shown.

A plurality of signals serve as inputs to the write logic circuitry 10. Write address signal lines 12 are a series of signal lines (e.g., six) providing the lower bits of a write address. The write address signal lines 12 are coupled to a first series of latches 14. In this example, six latches would be needed, however, only one is shown for the sake of clarity. A transmit processor clock(1) signal 16 is coupled to each of the clock inputs of the first series of latches 14. The assertion of the transmit processor clock(i) 16 causes the values on the write address signal lines 12 to appear at the outputs of the first series of latches 14.

Write value signal lines 18, are a series of signal lines (e.g., eight) providing the values to be written to a shared memory (discussed below). The write value signal lines 18 are coupled to an equal number of latches in a second series of latches 20. The transmit processor clock(1) 16 is also coupled to the clock inputs of the second series of latches. The values on the write value signal lines 18 will appear at the outputs of the second series of latches 20 while the transmit processor clock(1) 16 is asserted. Only one of the write value signal lines 18 is needed for writing data to a bit-RAM memory device (discussed below). The entire series of write value signal lines 18 are used for byte-wide write operations to a RAM.

A stored value signal line 22 holds the bit value currently stored in the shared memory at the write address appearing on the write address signal lines 12. The stored value signal line 22 is coupled to inputs of a D flip-flop 24. Again, the transmit processor clock(1) 16 is coupled to the clock input of the D flip-flop 24. The value appearing on the stored signal line 22 appears at the output of the D flip-flop 24 when the transmit processor clock(1) 16 is asserted.

Each value stored in the shared memory and appearing on the stored signal lines 22 is compared to the lowest order bit value on the write value signal lines 18 in a first exclusive NOR (XNOR) gate 26. The output of the first XNOR gate 26 will be low only if the value to be written is different than the value currently stored. The output of the first XNOR gate 26 is coupled to a first input of a NOR gate 28. The most significant bit 32 of the write address appearing at the outputs of the first series of latches 14 is coupled to a second input of the NOR gate 28. This bit 32 indicates whether data is to be written to a bit-RAM or a byte-wide RAM. A third input of the NOR gate 28 is coupled to decoding/selection circuitry 30. The decoding/selection circuitry 30, is application specific and is used to insure that a write operation is meant to be performed using the write logic circuitry 10. A low signal output from the decoding/selection circuitry 30 indicates that the write logic circuitry 10 has been properly selected for a write operation.

The NOR gate 28 will output a high value if each of its three inputs has a low value. As stated previously, the output of the first XNOR gate 26 will be low if the value to be written is different than the value currently stored. Also, the value appearing at the output of the decoding/selection circuitry 10 will be low if the write logic circuitry 10 has been selected. Finally, the most significant bit 32 of the write address signal lines 12 will be high when a write operation is to be performed to the bit-RAM. The most significant bit 32 is passed to an input of the first NOR gate 28. The output of the first NOR gate 28 will only be high if all three inputs have low values. The output of the first NOR gate 28 serves as an enabling signal and first input for a first NAND gate 36. A second XOR gate 46 operates in a similar manner for write operations in a byte-wide RAM.

The second input of the first NAND gate 36 is coupled to a transmit processor clock(2) 38. The third input of the first NAND gate 36 is coupled to a receive processor clock(2) 40. The fourth input of the first NAND gate 36 is coupled to a transmit processor strobe 42. The output of the first NAND gate 36 serves as a write pulse 44 and will only be low if all of the inputs to the first NAND gate have high values. The write pulse 44 will only be generated at the end of a Q3 phase which is shown in more detail with reference to FIG. 4. A second NAND gate 48 operates in a similar manner for write operations in a byte-wide RAM.

A slightly varied form of the write logic circuitry 10 of FIG. 1 will be found in the receive processor as receive processor write logic (not shown). In the receive processor write logic, the values for the write address signal lines and write data signal lines will be generated by the receive processor. Also, the transmit clock(1), clock(2), and strobe signals will be replaced by the similar clock and strobe signals found in the receive processor. Finally, the decoding/selection circuitry will be replaced with circuitry tailored to the selection of the receive processor write logic circuitry.

Figure 2:
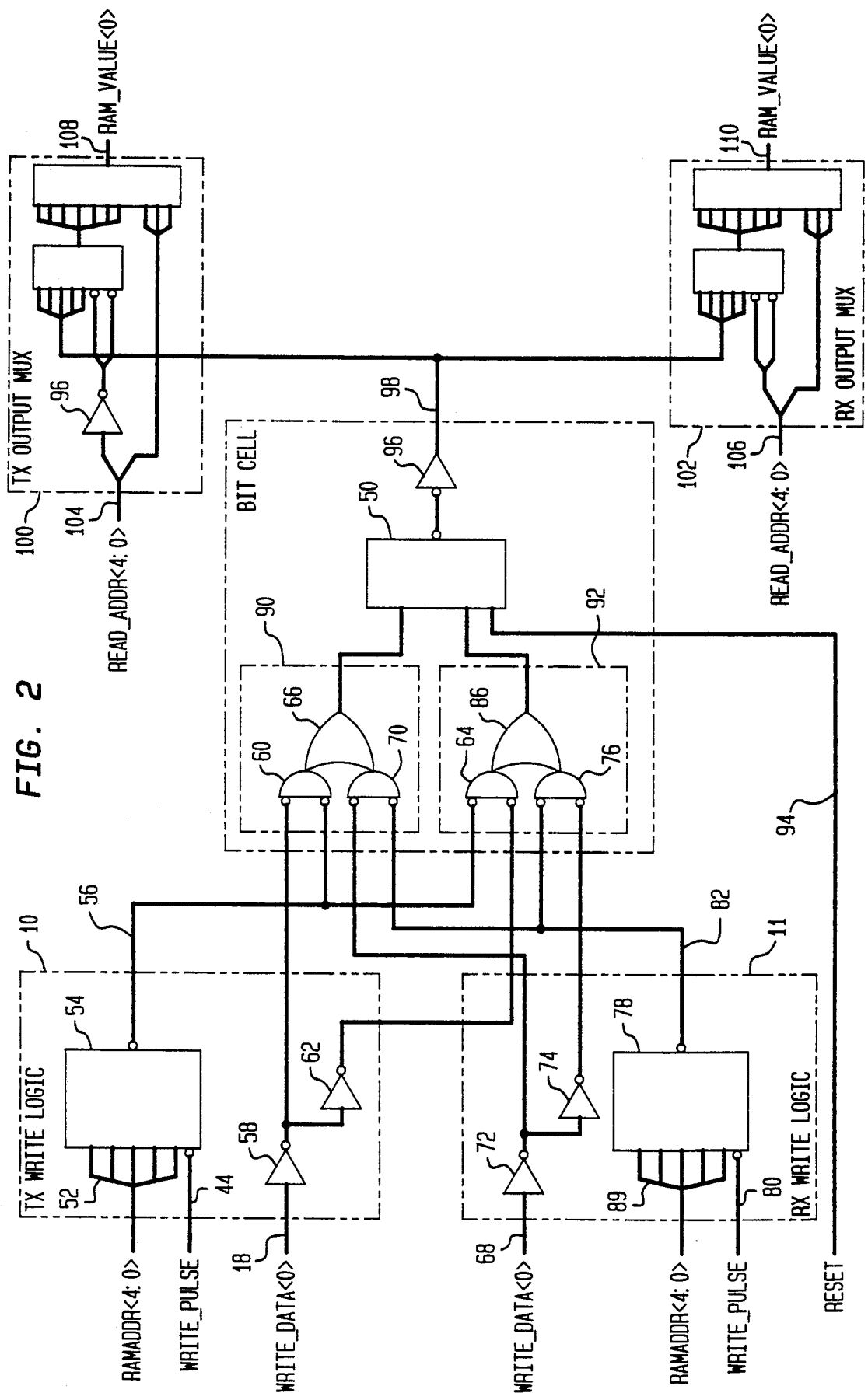
FIG. 2 is a detailed diagram of the coupling between two processors and a memory device.

Referring to FIG. 2, the coupling of the transmit write logic circuitry 10 and receive write logic circuitry 11 to a shared memory 50 is shown. In the transmit write logic 10, the lower bits 52 of the write address signal lines 12 (see FIG. 1) are coupled to a demultiplexer 54. The enable input of the demultiplexer 54 is coupled to the write pulse signal 44. A low write pulse signal 44 serves as an enabling signal for the demultiplexer thus causing one of 32 output signals 56 to become asserted. Only one of the output signals 56 is shown for the sake of clarity.

The value to be written to the memory 50 on the write data signal lines 18 (see FIG. 1) is coupled to a first input of a third NOR gate 60 via a first inverter 58. The output of the first inverter 58 is coupled to a first input of a fourth NOR gate 64 via a second inverter 62. One of the output signals 56 of the demultiplexer 54 is coupled to a second input of the third and fourth NOR gates 60, 64.

The receive processor logic 11 includes similar components as the transmit processor logic described above. A write data signal 68 for the receive processor logic 11 is coupled to a first input of a fifth NOR gate 70 via a third inverter 72. The output of the third inverter is coupled via a fourth inverter 74 to a first input of a sixth NOR gate 76. A demultiplexer 78 of the receiver processor logic 11 has the same structure as the demultiplexer 54 of the transmit processor logic. A write pulse signal 80 of the receive processor logic 11, which is similar to the write pulse 44 of the transmit processor logic 10, is coupled to the enabling input of the demultiplexer 78. When asserted, the write pulse signal causes one of the output signals 82 of the demultiplexer 78 to become asserted depending on the values appearing on write address signal lines 84, which operate similarly to the lower bits 52 of the transmit write logic circuitry 10. The output signal 84 of the demultiplexer 78 is coupled to a second output of the fifth NOR gate 70 and a second output of the sixth NOR gate 76. The outputs of the third and fifth NOR gates 60, 70 are coupled to inputs of a first OR gate 66 forming a setting component 90. The outputs of the fourth and sixth NOR gates 64, 76 are coupled to inputs of a second OR gate 86 forming a clearing component 92.

In the present embodiment, the memory 50 is implemented as a bit-RAM 50 which comprises 32 input set lines and 32 input clear lines for the storing of 32 separate bits of data. An output of the first OR gate 66 is coupled to one of the 32 input set lines of the bit-RAM 50. Also, an output of the second OR gate 86 is coupled to one of the 32 input clear lines of the bit-RAM 50. It will be appreciated by one having ordinary skill in the art that 32 versions of the setting component 90 will be present for each of the 32 input set lines of the bit-RAM 50. Also, 32 versions of the clearing component 92 will be present for each of the 32 input clear lines of the bit-RAM 50. The output signals 56, 82 of the demultiplexers 54, 78, respectively are coupled to each of the setting and clearing components 90, 92 in a one-to-one correspondence.

During normal operation, the transmit and receive processors read and write data bits from and to the bit-RAM 50. If a processor seeks to write a bit to a location in the bit-RAM 50 which is currently storing a bit having the same value, the write pulse 44, 80 will not be generated. Without the write pulse 44, 80, the outputs of the demultiplexers 54, 78 will not be generated and the setting and clearing components 90, 92 will prevent any modification of the bit-RAM memory locations.

At times, the transmit and receive processors will attempt to write data to the same bit location in the bit-RAM 50 (i.e. the address bits 52, 84 of the demultiplexers 54, 78 are identical). If one or more processors are attempting to write a bit in a location in the bit-RAM 50 storing the same value, the write pulse 44, 80 for that processor will not be asserted (as described above). If one of the processors is attempting to change the contents of a location in the bit-RAM 50, the corresponding write pulse 44, 80 will be asserted and the setting and clearing components 90, 92 will affect the appropriate modification. If both processors attempt to change the contents of the same memory location in the bit-RAM 50, then setting and clearing components 90, 92 will perform one write operation, thus one of the write requests is ignored. Using the write logic circuitry of the present invention, no arbitration or processing speed modification is necessary.

The bit-RAM 50 also comprises 32 output lines coupled to a series of inverters 96. The output signal lines 98 of the series of inverters 96 are coupled to each of a transmit processor output multiplexer 100 and a receive processor output multiplexer 102. When the transmit and receive processors read data bits from the bit-RAM 50, each will send its own read address on read address signal lines 104, 106. The read address is actually an unlatched version of the write address appearing on the write address signal lines (e.g., reference 12 in FIG. 1). When the transmit processor is reading from the bit-RAM 50, the read address appearing on the read address signal lines 104 is used by the multiplexer 100 to couple the output line 98 corresponding to the read address to a multiplexer output 108. This multiplexer output is additionally coupled to the appropriate one of the stored signal lines 22 seen in FIG. 1. Therefore, the write address appearing on write address signal lines 12 (See FIG. 1) is used by the transmit processor output multiplexer 100 to supply the appropriate bit value to the stored value signal lines 22. The receive processor output multiplexer 102 comprises similar circuitry as multiplexer 100 including an output signal line 110.

Referring to both FIGS. 1 and 2, a reset signal line 94 is provided to clear the contents of the first and second latches 14, 20, and D flip-flop 24, and the bit-RAM 50.

Figure 3:
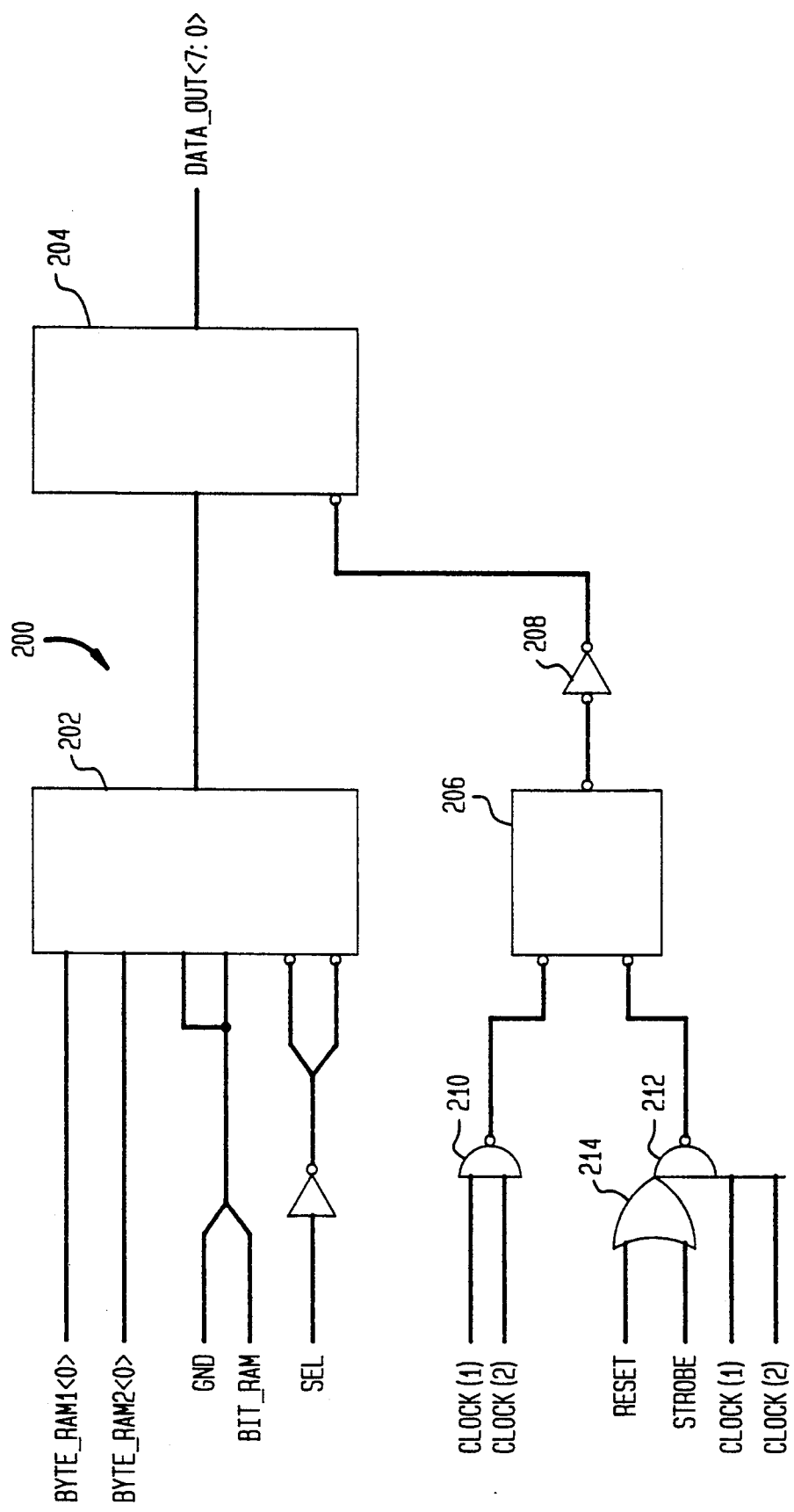
FIG. 3 is a detailed diagram of the read logic circuitry of a processor coupled to the memory device illustrated in FIG. 2.

Referring to FIG. 3, read logic circuitry 200 for the receive and transmit processors is shown. Each processor has read logic circuitry, and only one set is shown. The read logic circuitry 200 comprises a series of multiplexers 202 which temporarily stores the bit values stored in the bit-RAM 50. The series of multiplexers 202 are coupled to a series of latches 204. The clock inputs of the latches 204 are coupled to a set/reset flip-flop 206 via an inverter 208. The set input of the set/reset flip-flop 206 is coupled to a NAND gate 210 having inputs coupled to the clock(1) and clock(2) signals of a processor. When the clock(i) and clock(2) signals are all asserted, the output of the set/reset flip-flop 206 will be asserted and will force the latches 204 to close. Clock(1) and clock(2) will both become asserted at the beginning of the Q3 cycle (described below).

The reset input of the set/reset flip-flop 206 is coupled to a NAND gate 212. The reset signal and strobe signals are coupled to an OR gate 214, and the output of the OR gate 214 is coupled to one of the inputs of the NAND gate 212. The clock(l) signals and clock(2) signals are also coupled as inputs to the NAND gate 212.

The clock(1) and clock(2) signals that are input to the NAND gate 212 will make the latches 204 operate in a transparent mode from the Q1 cycle up to the beginning of the Q3 cycle as mentioned above. In this transparent mode, the data in the bit-RAM will not be modified since no write operations can occur until the end of the Q3 cycle. The data will remain latched by the latches 204 until the Q1 cycle when the strobe is deasserted or a reset signal is asserted.

Figure 4:
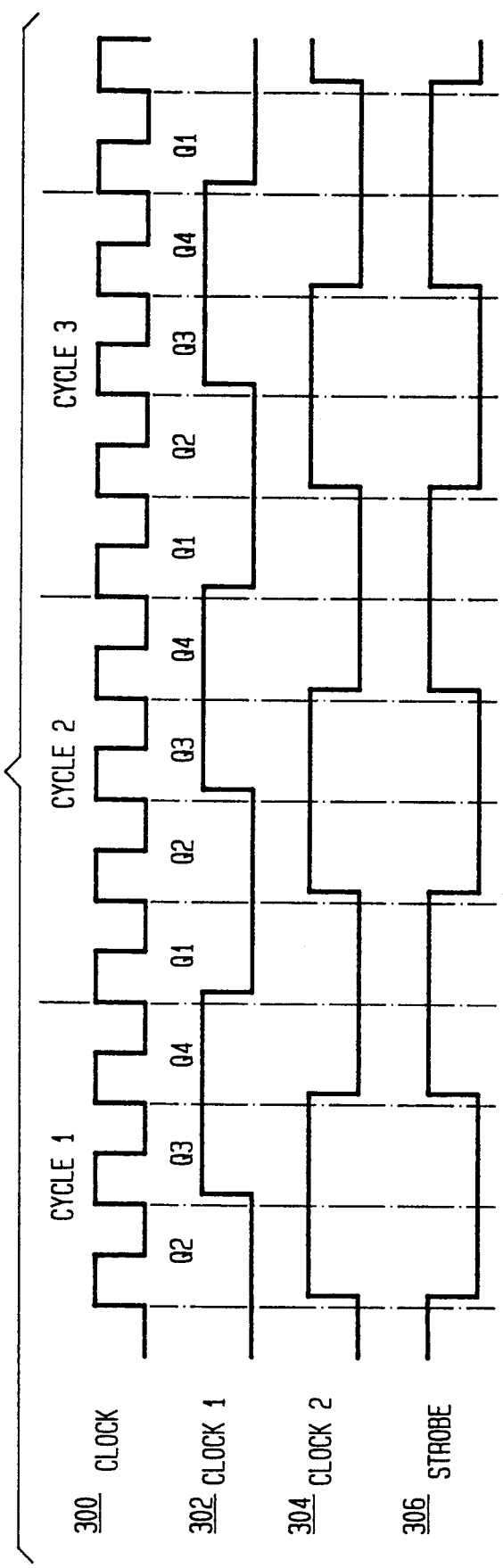
FIG. 4 is a timing diagram of the clock and strobe signals used by the processors when accessing the shared memory.

Referring to FIG. 4, a timing diagram for the processors is shown. In this embodiment, the system clock 300 operates at 40 Mhz and the clock(1) and clock(2) signals 302, 304 for each processor operate at 10 MHz and have a period of 100 nsec. The transmit and receive processors are coupled to the bit-RAM over a bus (not shown). The strobe signal 306 indicates that a processor is performing a bus transaction and looks much like the inverse of the clock(2) signal when continuous transactions occur. A write operation begins at the end of the Q3 cycle (both clock(1) and clock(2) are asserted). A read operation begins during the Q1 cycle and is completed at the beginning of the Q3 cycle.

Referring back to FIG. 1, the clock(2) signal 304 and strobe signal 306 of the transmit processor are coupled to two of the inputs of the first NAND gate 36. Both inputs are needed to insure that a bus transaction is actually taking place and includes any possible skewing between the two signals. A third input of the first NAND gate 36 is the clock(2) signal 304 of the receive processor. Though the receive and transmit processors are synchronized to some extent, a skewing error of up to 25 nsec. can occur. By including the clock(2) signal 304 of the receive processor, the duration of the write pulse 44 (see FIG. 1) lasts between approximately 25 nsec. to 50 nsec. Such a duration of the write pulse 44 helps to insure that no write operations will be performed on the bit-RAM 50 by the transmit processor while the receive processor attempts to perform a read operation on the same memory location, or vice versa.

WHAT IS CLAIMED IS:

1. A logic circuit adapted to be coupled between a processor and a memory, the memory having at least one memory location storing a binary data value, the memory having at least a first input and a first output, the logic circuit comprising:

a comparison circuit having an output and at least first and second inputs, the first input of said comparison circuit is coupled to the first output of the memory, such that the binary data value stored in the memory location is supplied to the first input of said comparison circuit, the second input of said comparison circuit is coupled to the processor, such that a binary data value to be written to the memory location is supplied to said second input of said comparison circuit, said comparison circuit generating a write enabling signal on the output only when the binary data value to be written to the memory location differs from the binary data value stored in the memory location, such that absence of the write enabling signal prevents storing in the memory the binary data value to be written to the memory location.

2. The logic circuit of claim 1 wherein said comparison circuit comprises an exclusive NOR gate.

3. The logic circuit of claim 1, further comprising:

a write pulse generating circuit having at least a first input and an output, the first input of said write pulse generating circuit coupled to the output of said comparison circuit, such that presence of the write enabling signal causes said write pulse generating circuit to generate a write pulse signal, such that absence of the write pulse signal prevents storing in the memory the binary data value to be written to the memory location.

4. The logic circuit of claim 3, wherein said write pulse generating circuit comprises a NAND gate.

5. A logic circuit adapted to be coupled between at least first and second processors and a memory, a memory having at least one memory location storing a binary data value, the memory having at least a first input and a first output, the logic circuit comprising:

a first comparison circuit, having an output and at least first and second inputs, the first input of said first comparison circuit is coupled to the first output of the memory, such that the binary data value stored in the memory location is supplied to the first input of said first comparison circuit, the second input of said first comparison circuit is coupled to the first processor, such that a binary data value to be written to the memory location by the first processor is supplied to said second input of said first comparison circuit, said first comparison circuit generating a write enabling signal on the output of the first comparison circuit only when the binary data value to be written to the memory location by the first processor differs from the binary data value stored in the memory location, such that absence of the write enabling signal prevents storing in the memory the binary data value to be written to the memory location; and a second comparison circuit, having an output and at least first and second inputs, the first input of said second comparison circuit is coupled to the first output of the memory, such that the binary data value stored in the memory location is supplied to the first input of said second comparison circuit, the second input of said second comparison circuit is coupled to the second processor, such that a binary data value to be written to the memory location by the second processor is supplied to said second input of said second comparison circuit, said second comparison circuit generating a write enabling signal on the output of the second comparison circuit only when the binary data value to be written to the memory location by the second processor differs from the binary data value stored in the memory location, such that absence of the write enabling signal prevents storing in the memory the binary data value to be written to the memory location.

6. The logic circuit of claim 5, wherein each of said first and second comparison circuits comprises an exclusive NOR gate.

7. The logic circuit of claim 6, further comprising:

a first write pulse generating circuit having at least a first input and an output, the first input of said first write pulse generating circuit coupled to the output of said first comparison circuit, such that presence of the write enabling signal from said first comparison circuit causes said first write pulse generating circuit to generate a write pulse signal, such that absence of the write pulse signal prevents storing in the memory the binary data value to be written to the memory location; and a second write pulse generating circuit having at least a first input and an output, the first input of said second write pulse generating circuit coupled to the output of said second comparison circuit, such that presence of the write enabling signal from said second comparison circuit causes said second write pulse generating circuit to generate a write pulse signal, such that absence of the write pulse signal prevents storing in the memory the binary data value to be written to the memory location.

8. The logic circuit of claim 7, wherein each of said first and second write pulse generating circuits comprises a NAND gate.

9. The logic circuit of claim 8, wherein the memory further comprises a second input, such that presence of a signal at said first input causes the memory to store an asserted value in the memory location and the presence of a signal at said second input causes the memory to store a deasserted value in the memory location, said logic circuit further comprising:

a setting component having a plurality of inputs and at least one output, a first input of said setting component is coupled to the output of said first comparison circuit, a second input of said setting component is coupled to the output of said second comparison circuit, a third input of said setting component is coupled to the output of said first write pulse generating circuit, a fourth input of said setting component is coupled to the output of said second write component, such that said setting component generates a setting signal when both the binary data value to be written to the memory location by a one of the processors and the corresponding write pulse signal are present from at least one of the processors; and a clearing component having a plurality of inputs and at least one output, a first input of said clearing component is coupled to the output of said first comparison circuit, a second input of said clearing component is coupled to the output of said second comparison circuit, a third input of said clearing component is coupled to the output of said first write pulse generating circuit, a fourth input of said clearing component is coupled to the output of said second write component, such that said clearing component generates a clearing signal when the binary data value to be written to the memory location by a one of the processors is absent and the corresponding write pulse signal is present absent from at least one of the processors.

* * * * *